(12) United States Patent
Konno

(10) Patent No.: US 7,215,046 B2
(45) Date of Patent: May 8, 2007

(54) SMALL-SIZED PLUNGER

(75) Inventor: Tomoaki Konno, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 136 days.

(21) Appl. No.: 11/064,971

(22) Filed: Feb. 25, 2005

(65) Prior Publication Data

US 2006/0043798 A1 Mar. 2, 2006

(30) Foreign Application Priority Data

Aug. 30, 2004 (JP) ............................ P2004-249669

(51) Int. Cl.
*H02K 41/00* (2006.01)

(52) U.S. Cl. ........................................................ 310/12

(58) Field of Classification Search ................... 310/12, 310/13, 15; *H02K 7/04*
See application file for complete search history.

(56) References Cited

U.S. PATENT DOCUMENTS 4,097,755 A * 6/1978 Kitai et al. .................. 310/114

FOREIGN PATENT DOCUMENTS

| JP | 5-47450 | | 12/1993 |
| JP | 2001135521 | * | 5/2001 |

* cited by examiner

*Primary Examiner*—Darren Schuberg
*Assistant Examiner*—Nguyen Hanh
(74) *Attorney, Agent, or Firm*—Whitham Curtis Christofferson & Cook, PC

(57) ABSTRACT

When a yoke 11 is inserted into a bobbin hole 20 from the one end of a coil bobbin 13A, 13B until a positioning portion 17 of the first leg 11A, 11B of the yoke 11 is brought into contact with the one end of the coil bobbin 13A, 13B a engaging portion 18 of the first leg 11A, 11B is engaged with the projection 13e of the coil bobbin 13A, 13B within the bobbin hole 20 so that the longitudinal movement of the yoke 11 for the coil bobbin 13A, 13B is limited. Through this limitation, the yoke 11 can be attached to the coil bobbin 13A, 13B.

8 Claims, 7 Drawing Sheets

SMALL-SIZED PLUNGER

BACKGROUND OF THE INVENTION

1. Field of the Invention

This invention relates to a small-sized plunger and more particularly to a small-sized plunger which is employed for aperture control or shutter control of a camera, tape rotation direction control or start/stop control of an audio device or VTR, or a device requiring a power source such as a household electric appliance and others, and has a structure in which a part of a yoke is passed through a coil bobbin.

2. Description of the Related Art

A previously known plunger is a self-holding type plunger in which with a movable piece is attracted to a yoke by a permanent magnet, an opposite magnetic field is generated by passing a pulse current through a coil to cancel the attractive force in the yoke so that the piece attracted is released from the yoke. This plunger has a structure as shown in FIG. 12.

A plunger 100 shown in FIG. 12 includes a yoke having a pair of first legs 101A, 101B and a coupling 101C is formed of a magnetic material such as Fe (iron) in a ⊃-shape; a permanent magnet 102 is mounted in a slit 106 formed by a gap between the first legs 101A and 101B of the yoke 101; coil 104A, 104B are wound on a pair of cylindrical coil bobbins 103A, 103B, respectively; and a movable piece 105 having a pair of second legs 105A, 105B and a coupling 105C is formed of material such as CU (copper) in the ⊃-shape. Incidentally, FIG. 13 is an external appearance perspective view of a single body of the yoke 101.

The yoke 101 is firmly mounted on the coil bobbins 103A, 103B by an adhesive so that the first legs 101A, 101B with the adhesive applied thereon are inserted into bobbin holes 103a, 103b of coil bobbins 103A, 103B from their end to a nearly central position. On the other hand, the movable piece 105 is slidably mounted on the coil bobbins 103A, 103B so that the respective second legs 105A, 105B of the movable piece 105 are inserted into the bobbin holes 103a, 103b until they are brought into contact with the first legs 101A, 101B, respectively from the other ends of the bobbin holes 103a, 103b of the coil bobbins 103A, 103B. The movable piece 105 is held in a state where the pair of second legs 105A, 105B of the movable piece 105 have been attracted to the S and N poles generated at the tips of the pair of first legs 101A, 101B of the yoke 101. Incidentally, with the pin of a lever (not shown) inserted into an attaching opening 105D for the movable lever 105, spring force F1 is always applied to the movable piece 105 through this lever.

For this reason, while a current is not passed through the coils 104A, 104B, the movable piece 105 is attracted to the yoke by attractive force F2 by the permanent magnet 102 against the spring force F1. When a current is passed through the coils 104A, 104B to generate a magnetic field opposite to the magnetic flux of the permanent magnet 102, the attracted movable piece 105 is separated from the yoke 101 by the spring force F1. The movement of the movable piece 105 when it is separated provides a necessary operation.

Incidentally, the structure of the self-holding type plunger as described above has been proposed In J-UM publication 5-47450 in addition to FIG. 12.

In the conventional plunger structure described above, the yoke 101 is fixed to the coil bobbins 103A, 103B through the adhesive. Until the adhesive hardens, further operations must wait. This reults in poor operability and long assembly time. In addition, because adhesive is used, working rooms become dirty and, because adhesives tend to have an unpleasent odor, working enviroments become less hospitable due to the smell. Further, when external force is applied to the bobbin before the adhesive hardens, the bobbin has a defective posture when fixed to the yoke which adversely affects operation of the movable piece.

SUMMARY OF THE INVENTION

Thus, in order to realize simple assembly of the yoke and coil bobbin without using adhesive, thereby improving the operability and working environment, a technical problem to be solved occurs. This invention intends to solve such a technical problem.

This invention has been accomplished in order to attain the above object. The invention described in claim 1 provides a plunger comprising: a pair of cylindrical coil bobbins each having a bobbin hole penetrating therethrough formed at the center, a projection formed within the bobbin hole and protruding toward the center of the bobbin hole and calls wound on the outer periphery thereof; a ⊃-shaped yoke having a pair of first legs inserted into the bobbin hole from the one end of the coil bobbins with the projection to a predetermined position and whose at least one has a engaging portion which to be engaged with the projection at the predetermined position so that it is prevented from coming off the coil bobbin; a permanent magnet which generates N and S poles at the tips of the pair of first legs of the yoke; and a ⊃-shaped movable piece having a pair of second legs slidably inserted in the bobbin holes of the pair of call bobbins, respectively from the other end of the coil bobbins until they are brought into contact with the first legs.

In accordance with this configuration, when the yoke is inserted into the bobbin holes from the one end of the coil bobbins to a predetermined position, the engaging portions of the first legs are engaged with the projections of the coil bobbins. Thus, by the contact engagement between the positioning portions and the one end of the coil bobbins, the coming-off of the yoke from the coil bobbins is limited. Through this limitation of coming off, the yoke is attached to the coil bobbins.

The invention described in claim 2 provides the plunger wherein the pair of coil bobbins are integrally formed of a resin material having elasticity.

In accordance with this configuration, since the pair of coil bobbins are integrally formed of a resin material having elasticity, when the engaging portions of the first legs of the yoke are inserted into the coil bobbins, they can be smoothly inserted because the bobbin holes are enlarged.

The invention described in claim 3 provides the plunger wherein a coupling between the pair of coil bobbins is thin-walled so that they are swingable independently from each other.

In accordance with this configuration, since the coupling between the pair of coil bobbins is thin-walled, the pair of coil bobbins can be freely swung at a fulcrum of this thin-walled coupling. Thus, for example, when the coil is wound on each coil bobbin, with each coil bobbin being swung in the posture permitting the coil to be easily wound, the operation of winding the coil can be done.

The invention described in claim 4 provides the plunger wherein the yoke has positioning portions which are positioned in contact with the one side of the coil bobbins when the yoke is inserted to the predetermined position.

In accordance with this configuration, when the yoke is inserted to the predetermined position, the positioning portions are brought into contact with the one end of the coil bobbins so that the yoke cannot be further inserted. Thus, the yoke inserted into the coil bobbins is limited in its longitudinal movement for the coil bobbins by the contact between the positioning portions on the side of the yoke and the one end of the coil bobbins and the contact between the engaging portions on the side of the yoke 11 and the projections on the side of the coil bobbins. Through this limitation, the yoke is attached to the predetermined position of the coil bobbins.

The invention described in claim 5 provides the plunger wherein the coil bobbins each has flanges protruding outwardly at its both front and rear ends, and each flange at the one end is provided with the projection.

In accordance with this configuration, the coils can be wound using the flanges at both front and rear ends, and the flanges can be employed as the portions to be in contact with the positioning portions of the yoke.

The invention described in claim 6 provides the plunger wherein the engaging portions provided at the pair of legs, respectively are formed on inner side surfaces opposite to each other of the pair of legs.

In accordance with this configuration, there is provided the plunger in which the engaging portions are formed on inner side surfaces of the pair of legs.

The invention described in claim 7 provides the plunger wherein the engaging portions provided at the pair of legs, respectively are formed on outer side surfaces opposite to each other of the pair of legs, in accordance with this configuration, there is provided the plunger wherein the engaging portions protruding outwardly are formed on outer side surfaces of the pair of legs.

The invention described in claim 8 provides the plunger wherein the engaging portions provided at the pair of legs, respectively are formed on outer side surfaces oriented in the same direction of the pair of legs.

In accordance with this configuration, there is provided the plunger wherein the engaging portions protruding in the same outer direction are formed on the one outer side surfaces of the pair of legs.

In accordance with the invention described in claim 1, only by inserting the yoke into the bobbin holes from the one end of the coil bobbins, the yoke can be easily assembled with the coil bobbins without using adhesive. Thus, the working time can be shortened, thereby improving the workability. Further, since the adhesive is not employed, the working room can be prevented from becoming dirty, and the working environment can be improved by removal of stench of the adhesive. Further, since the coil bobbins are not adhesively fixed to the yoke, when the movable piece slides in an oblique direction, the coil bobbins can slant in the same direction. Thus, without giving stress such as friction with the sliding face of the coil bobbins, the movable piece can be smoothly operated.

In accordance with the invention described in claim 2, since the coil bobbins can be easily made by resin molding, in addition to the advantage of the invention described in claim 1, when the engaging portions of the first legs of the yoke are inserted into the coil bobbins, they can be smoothly inserted because the bobbin holes are enlarged, thereby improving the workability.

In accordance with the invention described in claim 3, with each coil bobbin being swung in the posture permitting the coil to be easily wound, the operation of winding the coil can be done, thereby further improving the workability in addition to giving the advantage of the invention described in claim 1 or 2.

In accordance with the invention described in claim 4, if the yoke is inserted into the coil bobbins until the positioning portions are positioned in contact with their contact with the one end of the coil bobbins, the yoke can be attached to the predetermined position of the coil bobbins, thereby further improving the workability in addition to giving the advantage of the invention described in claim 3.

In accordance with the invention described in claim 5, the coils can be wound using the flanges at both front and rear ends, and the flanges can be employed as the portions to be in contact with the positioning portions of the yoke, thereby further improving the workability in addition to giving the advantage of the invention described in claim 1, 2, 3 or 5.

In accordance with the invention described in claim 6, since the yoke with the engaging portions formed inside the pair of legs is employed, the plunger can be downsized in addition giving the advantage of the invention described in claim 1, 2, 3, 4 or 5.

In accordance with the invention described in claim 7, by providing the engaging portions protruding outwardly outside the pair of legs, the yoke which can be easily machined and made at a low cost is employed. For this reason, the plunger can be obtained at a low cost in addition to giving the advantage of the invention described in claim 1, 2, 3, 4 or 5.

In accordance with the invention described in claim 8, by providing the engaging portions protruding in the same outer direction on the one outer side surfaces of the pair of legs, the yoke which can be easily machined and made at a low cost is employed. For this reason, the plunger can be obtained at a low cost in addition to giving the advantage of the invention described in claim 1, 2, 3, 4 or 5

DESCRIPTION OF THE PREFERRED EMBODIMENTS

Figure 1:
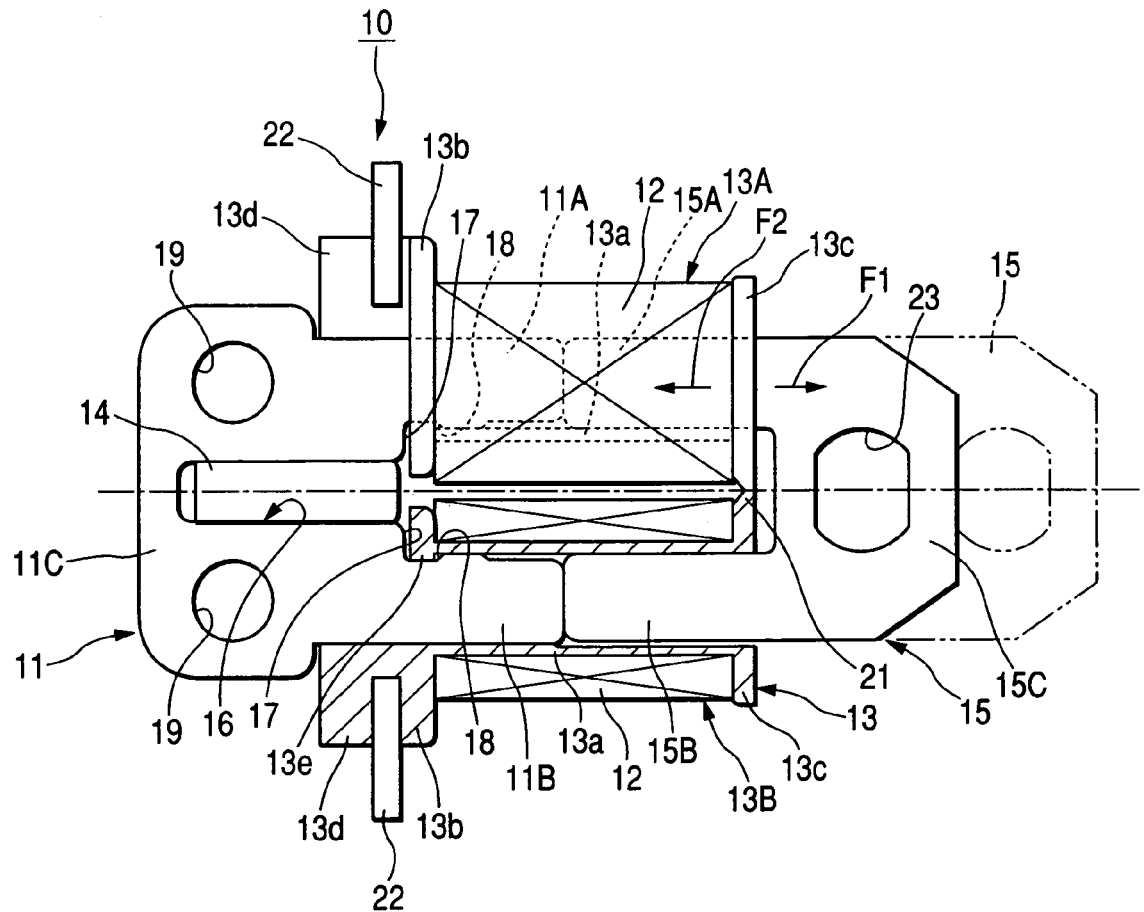
FIG. 1 is a partially broken side View on the upper half according to an embodiment of this invention.
Figure 2:
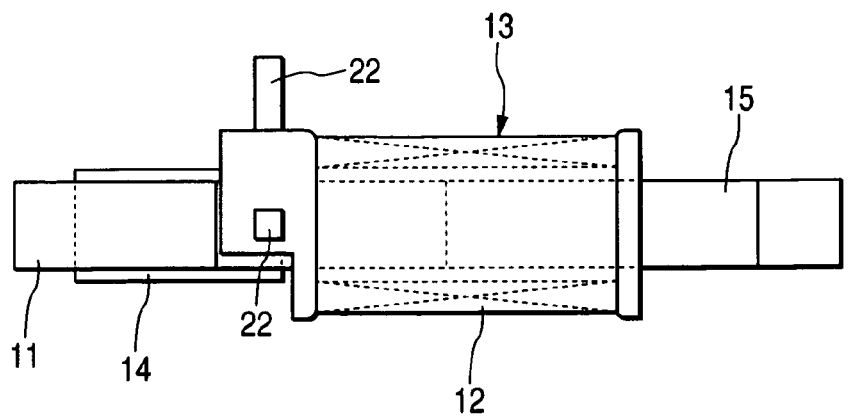
FIG. 2 is a top view of the plunger according to this invention.
Figure 3:
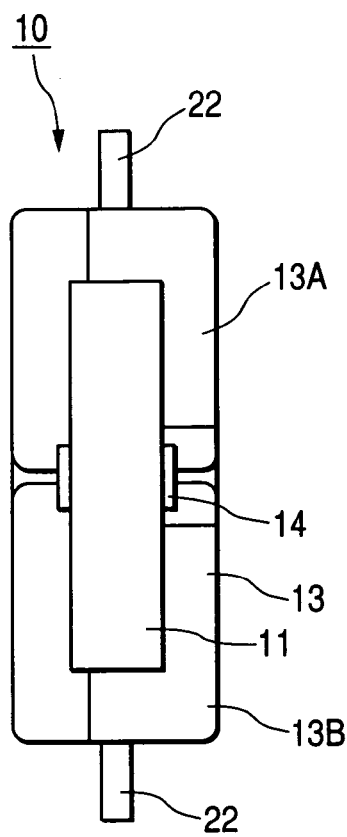
FIG. 3 is a left side view of the plunger according to this invention.
Figure 4:
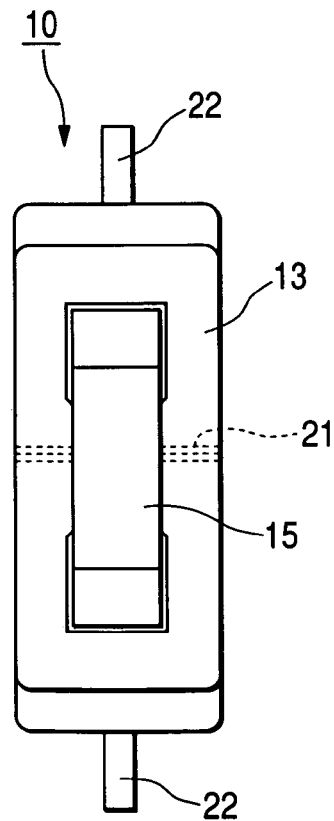
FIG. 4 is a right side view of the plunger according to this invention.
Figure 5:
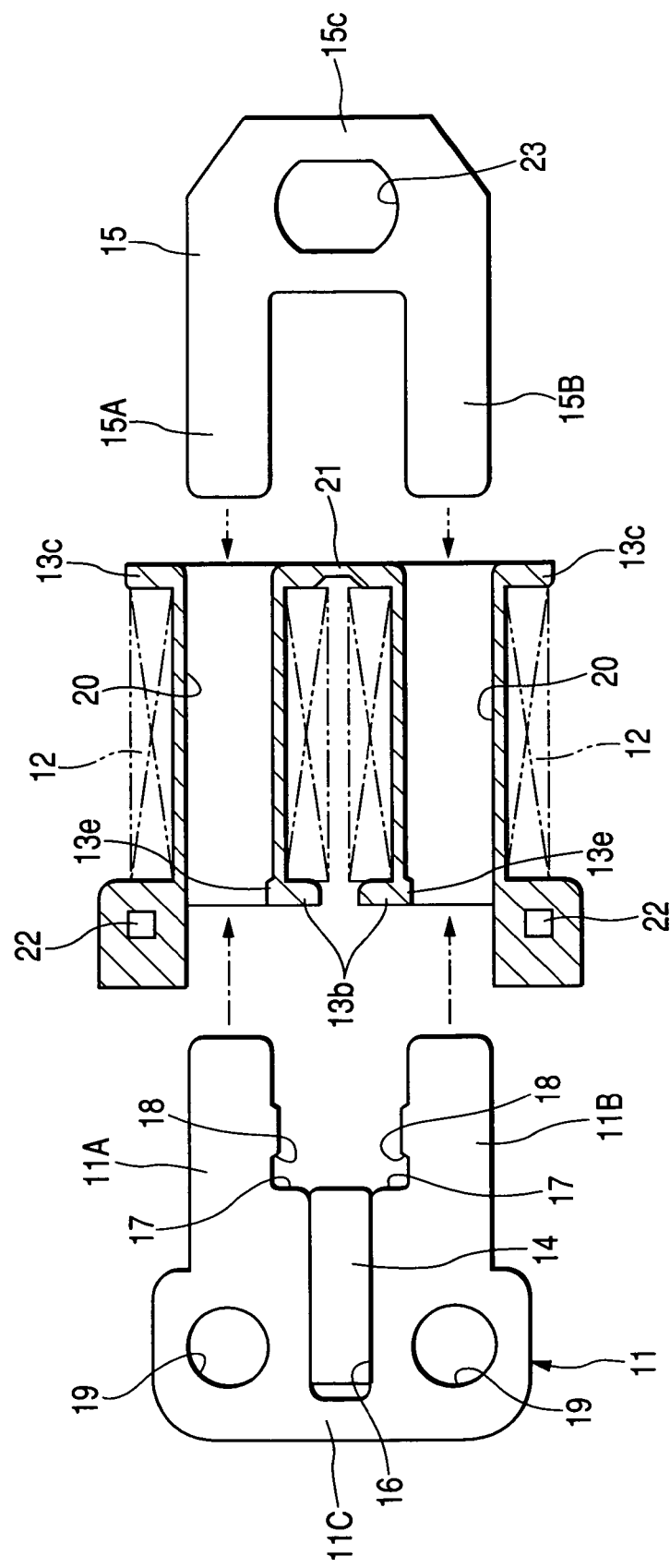
FIG. 5 is an exploded view of the main part of the plunger according to this invention.
Figure 6:
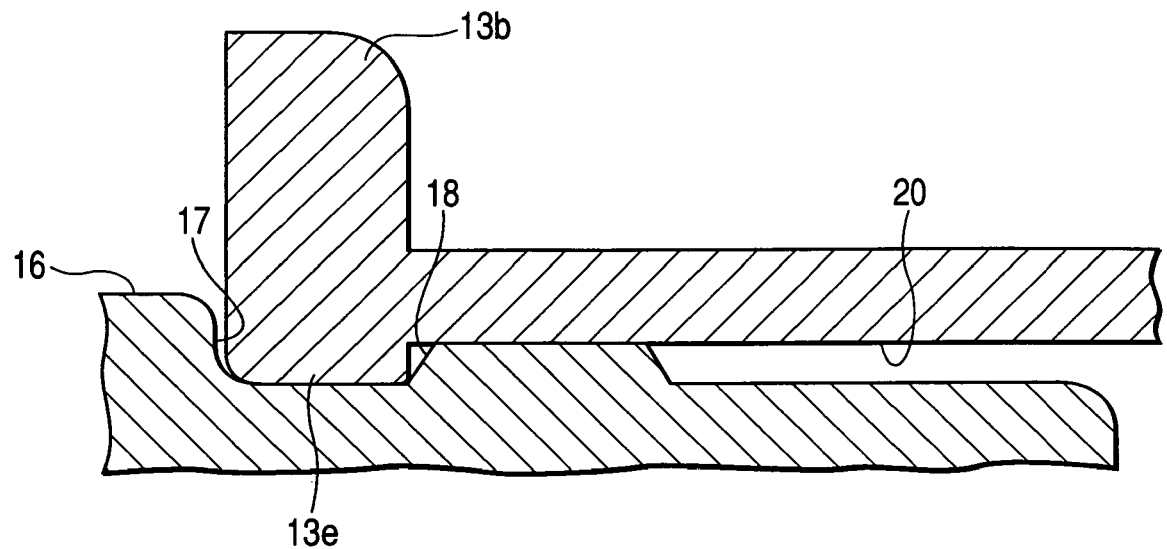
FIG. 6 is a partially enlarged sectional view of the plunger according to this invention.
Figure 7:
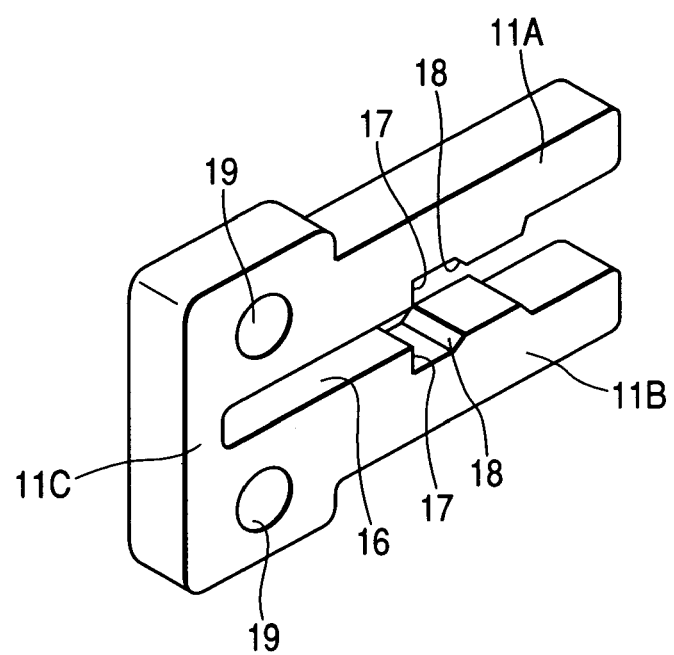
FIG. 7 is a perspective view of a yoke in the plunger according to this invention.

An explanation will be given of the plunger according to this invention referring to a preferred embodiment. In accordance with this invention, the object of assembling the yoke and coil bobbin simple without using adhesive. Improving the operability and working environment can be attained by a plunger structure in which a yoke is inserted into bobbin holes until the positioning portions of the first legs of the yoke are brought into contact with the one end of the coil bobbins, the engaging portions of the first legs are engaged with the projections of the coil bobbins so that they do not come off, thereby attaching the yoke to the predetermined position of the coil bobbins.

Embodiment 1

FIGS. 1 to 7 show a plunger according to the first embodiment of this invention. In FIGS. 1 to 7, a plunger 10, which is a self-holding electromagnet device, includes a yoke 11, a coil bobbin body 13 with coils 12, 12 wound on the outer periphery, a permanent magnet 14, a movable piece 15, etc.

The yoke 11 is made of a magnetic material of Cu (copper), for example, and integrally includes a pair of first legs 11A, 11B and a coupling 11C which couples the pair of first legs 11A, 11B in their base; and formed in a ⊃-shape. Further, in a slit 16 adjacent to the coupling 11C and formed by a gap between the first legs 11A and 11B, a slender permanent magnet 14 is mounted. Thus, the yoke 11 is in a state where it is always magnetized by this permanent magnet 14 so that N and S poles are occurring at the tips of the pair of first legs 11A, 11B. Each of the first legs 11A, 11B is provided with a stop which constitutes a positioning portion 17 at a front terminating area of the slit 16 and another step which constitutes a engaging portion 18 formed internally on a more front side than the positing portion 17. The coupling 11C has attaching openings employed for attaching and fixing the yoke 11 to a device by a screw, for example.

The coil bobbin body 13 is integrally die-molded by resin having elasticity, such as liquid crystal polymer, to provide a pair of cylindrical coil bobbins 13A, 13B so that the entire coil bobbin body is caused to have elasticity. The coil bobbins 13A, 13B have the same shape and are symmetrical with respect to the left and right.

Each coil bobbin 13A, 13B has a body 13a on which the coil 12 is wound and flanges 13b, 13c provided at both ends thereof. At the center of the coil bobbin 13A, 13B, a bobbin hole 20 is made to penetrate through the coil bobbin in a longitudinal direction. In the bobbin hole 20, the first leg 11A, 11B of the yoke 11 is fit. On the side of the flanges 13b, 13b at the one end, thick-walled portions 13 are provided. At the thick-walled portions 13d, 13d on the side of the end of bodies, a pair of terminal pins 22 are embedded to project sideward. The terminal pins are used in processing the end of the coil 12 wound on the outer periphery of the body 13a and soldering connecting wires.

Incidentally, whereas the flanges 13b, 13b at the one end of each coil bobbin 13A, 13B are separated from each other, the flanges 13c, 13c at the other and thereof are coupled with each other so that the coil bobbins 13A, 13B are integrated. Between the flanges 13c, 13c coupled with each other, a thin-walled portion 21 is formed. This thin-walled portion can be used as a hinge, thereby permitting the coil bobbins 13A, 13B to bend and swing to each other. Thus, this bending can be changed by swinging the coil bobbins 13A, 13B in a posture facilitating winding of coils 12 when each of the coils 12 is wound on the body 13a of each coil bobbin 13A, 13B.

Further, the bobbin hole 20 of each coil bobbin 13A, 13B is formed as an angular hole having the same square shape as the sectional shape of the first leg 11A, 11B of the yoke 11. The first leg 11A, 11B is structured so that it can be pressure-inserted into the bobbin hole 20. Further, on the inner wall of the bobbin hole 20 (actually, inner wall opposite to the flange 13b, 13b at the one end) which corresponds to the side surface where the positioning portion 17 of the first leg 11A, 11B is provided, a projection 13e is formed integrally to the coil bobbin 13A, 13B so as to protrude toward the center of the bobbin hole 20.

The movable piece 15 is made of a magnetic material such as Fe (iron), integrally includes a pair of second legs 15A, 15B and a coupling 15C which couples the pair of second legs 15A, 15B in their base and is formed of a magnetic material such as Fe (iron) in a ⊃-shape. The sectional shape of the second leg 15A, 15B is the same square shape as the sectional shape of the bobbin hole 20 of the coil bobbin 13A, 13B. The second leg 15A, 15B is structured with a size to be slidable within the bobbin hole 20. Further, the coupling 15C has an attaching opening 23 into which a pin of lever (not shown) is inserted.

An explanation will be given of an example of the procedure of assembling the plunger 10 structured as described above. First, a bobbin body 13 and a yoke 11 are prepared. The bobbin body has the coil 12 wound on the outer periphery of the body 13a, 13a of the coil bobbin 13A, 13B and its ends connected to the terminal pins 22, respectively are prepared. The yoke 11 has the permanent magnet 14 fit in the slit 16. Next, the first leg 11A, 11B of the yoke 11 is inserted into the bobbin hole 20 of the coil bobbin 13A, 13B from the side of the flange 13b, 13b at the one end of the coil bobbin 13A, 13B. When inserted, the projection 13e protruding within the bobbin hole 20 is brought into contact with the tip of the first leg 11A, 11B. However, when it is pushed strongly, the coil bobbin 13A, 13B is pushed by the first leg 11A, 11B so that the coil bobbin 13A, 13B is elastically deformed outwardly. Because of this deformation, the bobbin hole 20 is enlarged so that the first leg 11A, 11B can be inserted into the bobbin hole 20.

When insertion is further continued, the engaging portion 18 is brought into contact with the projection 13e. When the first leg 11A, 11B is inserted until immediately before the positioning portion 17 is brought into contact with the flange 13b, 13b at the one end of the coil bobbin 13A, 13B, the projection 13e falls on the first leg 11A, 11B outside the engaging portion 18. Thus, the projection 13e is brought into contact with the first leg 11A, 11B. In this state, the engaging portion 18 and positioning portion 17 are arranged on both sides of the projection 13a. Thus, a "come-off stopping engagement" is made by the contact between the positioning portion 17 on the side of the yoke 11 and the one end of the coil bobbin 13A, 13B and the contact between the engaging portion 18 on the side of the yoke 11 and the projection 13e on the side of the coil bobbin 13A, 13B. This "come-off stopping engagement" limits the longitudinal movement of the yoke 11 for the coil bobbin 13A, 13B. As a result, the yoke 11 is fixedly attached to the coil bobbin 13, 13B. In this fixedly attached status, as seen from FIGS. 1 and 2, the first leg 11A, 11B protrudes to the central position within the bobbin hole 20.

Subsequently, the second leg 15A, 15B of the movable piece 15 is inserted into the bobbin hole 20 of the coil bobbin 13A, 13B from the flange 13c, 13c at the other end of the coil bobbin. When the second leg 15A, 15B is brought into contact with the tip of the first leg 11A, 11B of the yoke 11, the movable piece 15 is attracted and held to the N and S poles generated at the tips of the pair of first legs 11A, 11B of the yoke 11, thus completing the assembling of the plunger. FIGS. 1 to 4 shows the state of the plunger after assembled.

In the plunger structured 10 as described above, while a current is not passed through the coil 12, 12, the yoke 11 attracts the movable piece 15 by means of attractive force F2 by the permanent magnet against spring force F1. Further, when the current is passed through the coil 12, 12 to generate a magnetic field opposite to the magnetic flux of the permanent magnet 14, the movable piece 15 is separated from the yoke 11 by the spring force F1. The movement of the movable piece 15 when it is separated provides a necessary operation.

Thus, in the plunger 10 structured as described above, when the yoke 11 is inserted into the bobbin hole 20 from the one end of the coil bobbin 13A, 13B to a predetermined position where the positioning portion 17 of the first leg 11A, 11B is brought into contact with the flange 13b, 13b of the coil bobbin 13A, 13B at the one end thereof, the engaging portion 18 of the first leg 11A, 11B is engaged with the projection 13e of the coil bobbin 13A, 13B so that the longitudinal movement of the yoke 11 for the coil bobbin 13A, 13B is limited. Through this limitation, the yoke 11 can be attached to the coil bobbin 13A, 13B so that the adhesive conventionally used in assembling is made unnecessary, thereby improving the operability and working environment. Further, since the coil bobbin body 13 is not adhesively fixed to the yoke 11, when the movable piece 15 slides in an oblique direction the coil bobbin can slant in the same direction. Thus, without giving stress such as friction with the sliding face of the coil bobbin body 13, the movable piece 15 can be smoothly operated.

Modification 1

Figure 8:
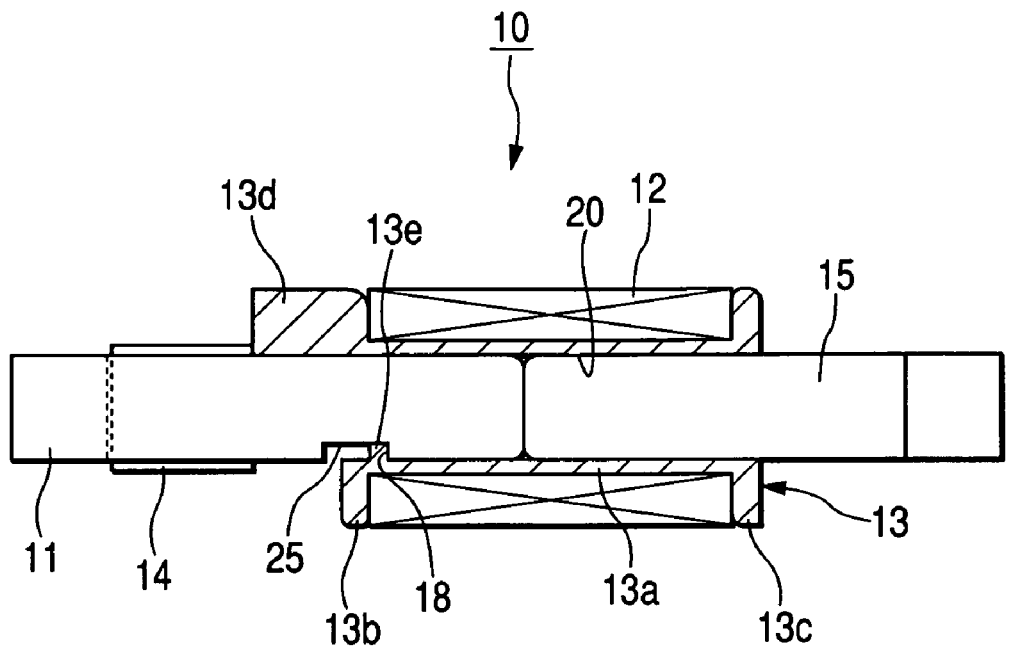
FIG. 8 is a partially broken top view of a plunger according to a first modification of this invention.
Figure 9:
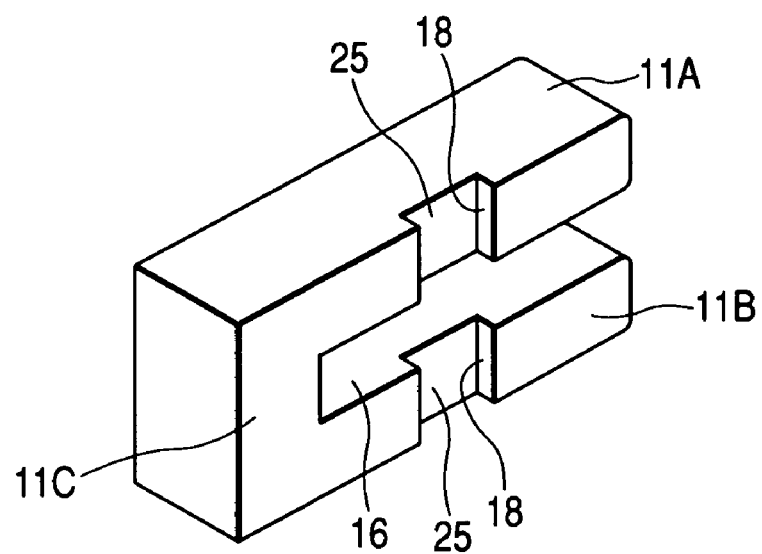
FIG. 9 is a perspective view of a yoke in the first modification of this invention.
Figure 10:
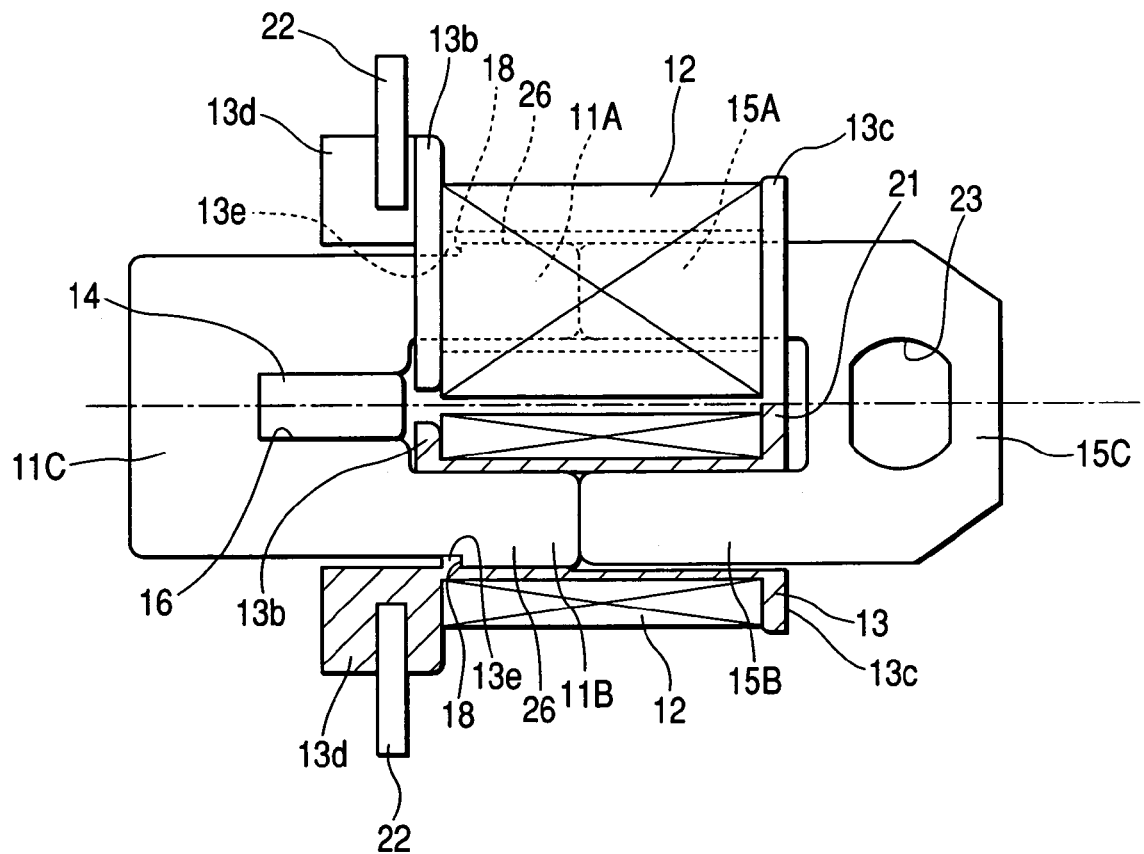
FIG. 10 is a partially broken side view on the lower half of a plunger according to a second modification of this invention.
Figure 11:
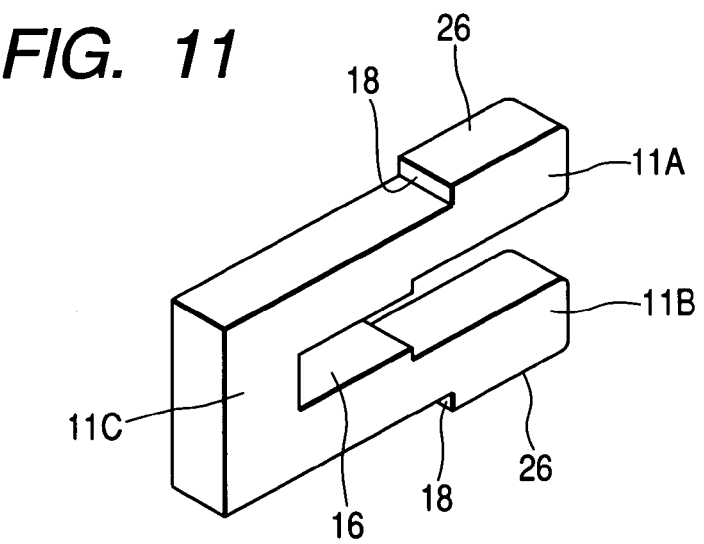
FIG. 11 is a perspective view of a yoke in the second modification of this invention.
Figure 12:
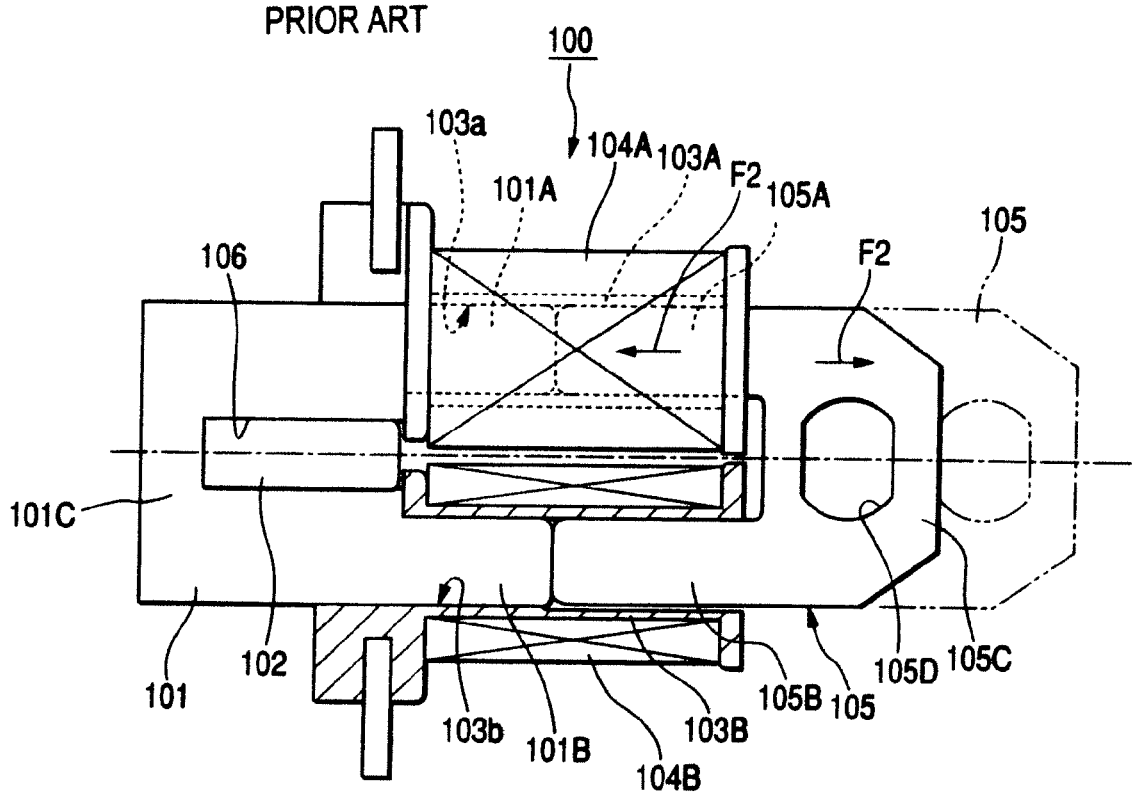
FIG. 12 is a partially broken side view on the lower half of the plunger according to a related art.
Figure 13:
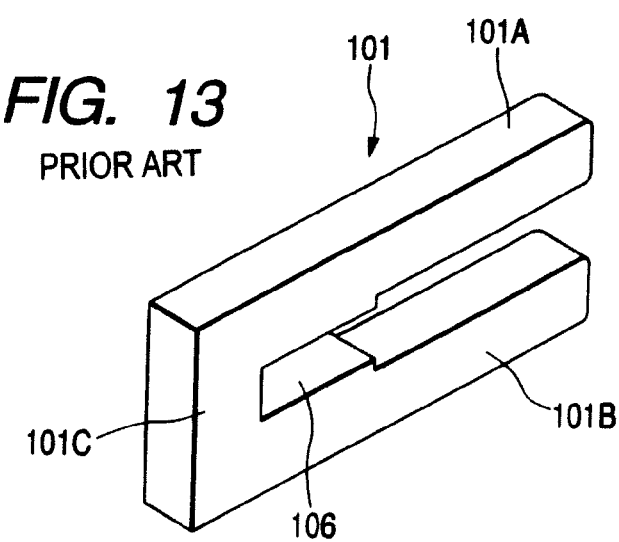
FIG. 13 is a perspective view of a yoke in the plunger according to the related art.

FIGS. 8 and 9 show a first modification of the plunger 10. In this first modification, a recess 25, 25 which constitutes the engaging portion 18 is formed on the side surface oriented in the same direction of the first leg 11A, 11B of the yoke 11. The remaining configuration is the same as that in FIGS. 1 to 4 so that the explanation will not be repeated with the same reference numeral denoting the same member. In the plunger 10 having this structure, the first leg 11A, 11B is pressure-fit into the bobbin hole 20. After pressure-fit, the engaging portion 18 and the projection 13e are engaged with each other, thereby providing a come-off stopping structure. Thus, in the structure according to the first modification, since the recesses 26 are made on the outer side surface of the yoke 11, the yoke 11 can be easily machined, thereby providing the plunger 10 at a low cost FIGS. 10 and 11 show a second modification of the plunger 10. In this second modification, swells 26 each of which constitutes the engaging portion 18 are formed on the upper and lower side surfaces of the yoke 11. The remaining configuration is the same as that in FIGS. 1 to 4 so that the explanation will not be repeated with the same reference numeral denoting the same member. In the plunger 10 having this structure, the first leg 11A, 11B is pressure-fit into the bobbin hole 20. After pressure-fit, the engaging portion 18 and the projection 13e are engaged with each other, thereby providing a come-off stopping structure. Thus, in the structure according to the second modification, since the swells 26 are made on the upper and lower side surfaces of the yoke 11 to constitute the engaging portions, the yoke 11 can be easily machined, thereby providing the plunger 10 at a low cost.

Incidentally, in the structure of the plunger according to the embodiment or modifications described above, the flange 13, 13B was formed at the positioning portion at the one end of the coil bobbin 13A, 13B However, the flange 13b, 13b is not necessarily required. Further, although the projection 13e was provided in each of the coil bobbins 13A and 13B, it may be provided in only the one coil bobbin.

Various modifications of this invention can be made as long as they do not depart from the spirit of this invention. And it is of course that this invention cover these modifications.

What is claimed is:

1. A plunger, comprising:
a pair of coil bobbins, each having:
   a tubular body;
   a pair of flanges, provided on an outer periphery of the tubular body at both ends thereof;
   a projection, formed on an inner periphery of the tubular body; and
   a coil, wound on the outer periphery of the tubular body;
a yoke, having a pair of first legs each of which is inserted into the tubular body from one end thereof and is formed with an engaging portion engaged with the projection;
a permanent magnet, generating N and S poles at tips of the first legs of the yoke; and
a movable piece, having a pair of second legs each of which is slidably inserted into the tubular body from the other end thereof.

2. The plunger according to claim 1, wherein the pair of coil bobbins are integrally formed of a resin material having elasticity.

3. The plunger according to claim 1, further including a coupling between the pair of coil bobbins is thin-walled so that the coil bobbins are swingable independently from each other.

4. The plunger according to claim 1, wherein each of the first legs has positioning portions which are in contact with the one end of the tubular body.

5. The plunger according to claim 1, wherein:
the engaging portions are formed on a side face of one of the first legs; and
the side face faces the other one of the first legs.

6. The plunger according to claim 1, wherein:
the engaging portions are formed on a first side face of one of the first legs; and
the first side face is opposite to a second side face facing the other one of the first legs.

7. The plunger according to claim 1, wherein:
the engaging portions are formed on a first side face of one of the first legs; and
the first side face is perpendicular to a second side face facing the other one of the first legs.

8. The plunger according to claim 1, wherein the projection is so positioned as to oppose one of the flanges.

* * * * *